(12) United States Patent
Oami et al.

(10) Patent No.: US 6,415,041 B1
(45) Date of Patent: Jul. 2, 2002

(54) DIGITAL WATERMARK INSERTION SYSTEM AND DIGITAL WATERMARK CHARACTERISTIC TABLE CREATING DEVICE

(75) Inventors: Ryoma Oami; Yoshihiro Miyamoto; Mutsumi Ohta, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/320,961

(22) Filed: May 27, 1999

(30) Foreign Application Priority Data

Jun. 1, 1998 (JP) .......................................... 10-150823

(51) Int. Cl.[7] ................................................ G06K 9/00
(52) U.S. Cl. ...................................................... 382/100
(58) Field of Search ............................... 382/100, 232, 382/309; 348/460; 713/161, 168, 169, 170, 176, 179, 180; 380/23

(56) References Cited

U.S. PATENT DOCUMENTS

| | | | | |
|---|---|---|---|---|
| 5,850,481 A | * | 12/1998 | Rhoads | 382/232 |
| 6,181,802 B1 | * | 1/2001 | Todd | 382/100 |
| 6,205,249 B1 | * | 3/2001 | Moskowitz | 382/232 |
| 6,343,138 B1 | * | 1/2002 | Rhoads | 382/100 |

FOREIGN PATENT DOCUMENTS

| | | | | |
|---|---|---|---|---|
| JP | A 191394 | 7/1999 | ......... | H04N/1/387 |

OTHER PUBLICATIONS

I.J. Cox, et al., Secure Spread Spectrum Watermarking for Multimedia, IEEE Transactions on Image Processing, vol. IP–6, No. 12, 1997, pp 1673–1787.

* cited by examiner

Primary Examiner—Andrew W. Johns
Assistant Examiner—Shervin Nakhjavan
(74) Attorney, Agent, or Firm—Scully, Scott, Murphy & Presser

(57) ABSTRACT

The present invention relates to a digital watermark insertion system that automatically calculates a digital watermark strength suitable to an input image and inserts a digital watermark into the image. The image categorizing section 103 classifies input images and outputs category indexes. The storage device 101 stores digital watermark characteristic tables describing the correspondences between digital watermark strength, image-quality degradation degree and attack-resistant evaluation value by category index and selects a digital watermark characteristic table to be used according to an input category index. The digital watermark strength calculation section 100 outputs a digital watermark strength to the storage device, calculates an optimum digital watermark strength using an image-quality degradation degree and a resistant evaluation value output from the storage device 103 and constraint information input by an user. The digital watermark insertion section converts embedded data into a digital watermark and inserts the digital watermark in an input image with the strength of an input optimum digital watermark strength, thus outputting a watermarked image.

11 Claims, 10 Drawing Sheets

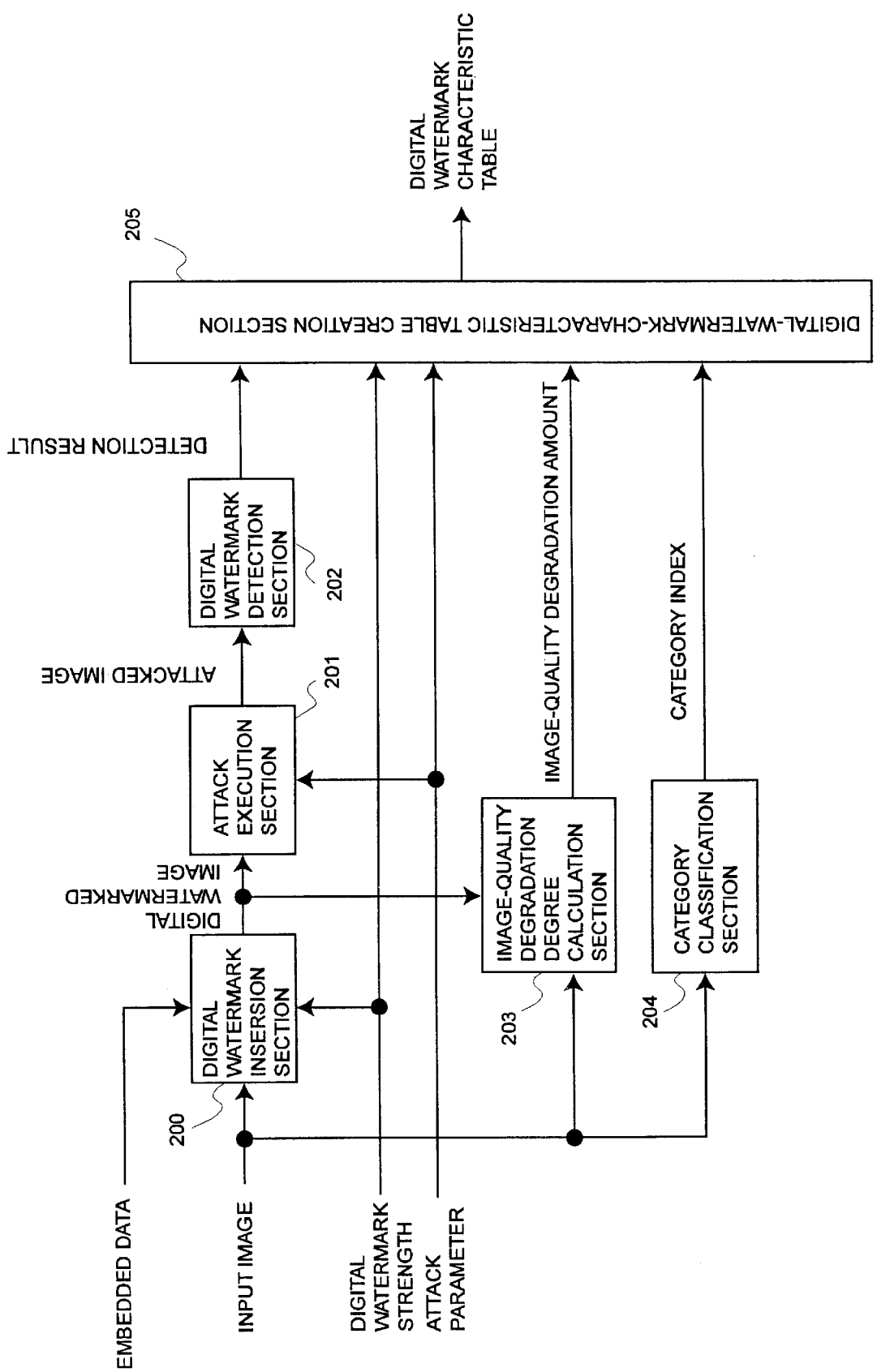

DIGITAL WATERMARK INSERTION SYSTEM AND DIGITAL WATERMARK CHARACTERISTIC TABLE CREATING DEVICE

BACKGROUND OF THE INVENTION

The present invention relates to a digital watermark insertion system that converts information into a digital watermark and then inserts it in an image.

Conventionally, this type of digital watermark insertion system is disclosed, for example, in JP-A-No. 191394/1997 or the literature, "IEEE TRANSACTIONS ON IMAGE PROCESSING", VOL. IP-6, No. 12, 1997, pp 1673–1687 and is designed to embed copyright information in digital signals creating audio and images.

FIG. 10 shows a conventional digital watermark inserter disclosed in the above-mentioned references. This inserter implements a DCT (Discrete Cosine Transform) or DFT (Discrete Fourier Transform) to input images and then outputs a transform coefficient to the mark inserter 1001. The mark inserter 1001 inserts a digital watermark signal in the transform coefficient output from the frequency converter 1000, with the digital watermark strength to be input. The inverse frequency converter 1002 subjects the watermarked transfer coefficient from the mark inserter 1001 to the inverse conversion opposite to the conversion by the frequency converter 1000 and then creates a watermarked image.

In operation, the frequency converter 1000 subjects all input images to the DCT or DFT process and then outputs the resultant transfer coefficients to the mark inserter 1001. The mark inserter 1000 also selects N transfer coefficients with the same digital watermark length in the transfer coefficient decreasing order and inserts a digital watermark in them. Specifically, a digital watermark is inserted according to the following formulas:
(formula 1)

$$v'=v+\alpha x$$

or
(formula 2)

$$v'=v(1+\alpha x)$$

where x represents a digital watermark signal; v represents an embedded transfer coefficient; $\alpha$ represents a digital watermark strength; and v' represents a watermarked transfer coefficient.

The inverse frequency conversion circuit 1002 subjects the resultant watermarked coefficient to the inverse DCT or inverse DFT process and then creates a watermarked image.

The image-quality degradation of a watermarked image and a digital watermark resistance against attacking are in a tradeoff relationship. Both the factors are balanced by adjusting the digital watermark strength $\alpha$ input to the mark inserter 1001. As $\alpha$ increases, the image-quality degradation of a watermarked image becomes large but the attack resistance property increases. On the contrary, as $\alpha$ decreases the image-quality degradation of a watermarked image can be suppressed but the attack resistance property decreases.

However, the above-mentioned digital watermark insertion system has the disadvantage in that it is difficult to properly set the digital watermark strength.

The difficulty comes from the fact that a user inconsiderately adjusts the digital watermark strength to insert a digital watermark. The conventional digital watermark insertion system does not include means for recognizing either how degree a possible image-quality degradation caused by digital watermark insertion is or how degree the resistant property against attacking is. Hence, the user can decide an optimum digital watermark strength only after the image-quality degradation caused by digital watermark insertion has been actually tried over plural digital watermark strengths. If the user does not try attacking, the attack resistance cannot be accurately evaluated.

A proper digital watermark strength greatly depends on the content of an image. Hence, the problem is that even if the relationships between digital watermark strength, image-quality degradation and resistant property against attacking are decisively shown to the user, it is difficult to apply the relationships to all images so that the resultant strength is different from the truly optimum digital watermark strength.

SUMMARY OF THE INVENTION

The present invention is made to solve the above-mentioned problems.

The objective of the invention is to provide a digital watermark insertion system that can automatically decide digital watermark strengths based on constraints and image features by a user.

Moreover, another objective of the present invention is to provide a digital-watermark-characteristic table creating device that can automatically decide digital watermark strengths based on constraints and image features by a user.

The objective of the present invention is achieved by a digital watermark insertion system, wherein digital watermark information is inserted in an image, comprising means for calculating feature values of input images, classifying the input images into categories with the feature values, and outputting a category index; storage means for storing digital watermark characteristic tables according to predetermined various category indexes, each of the tables describing relationships between digital watermark strength, image-quality degradation degree and attack-resistant evaluation value, selecting a digital watermark characteristic table according to the category index of an input image, and outputting an image-quality degradation degree corresponding to an input digital watermark strength and an attack-resistant evaluation value, digital-watermark-strength calculation means for outputting the digital watermark strength to the storage means, and deciding and outputting an optimum digital watermark strength using digital-watermark-strength constraint information to be input based on the image-quality degradation degree and the attack-resistant evaluation value output from the storage means; and means for converting embedded data to be input into a digital watermark, inserting the digital watermark into the input image, with the optimum digital watermark strength acting as an input parameter, and outputting it as a watermarked image.

In the digital watermark insertion system according to the present invention, the digital-watermark-strength constraint information is a permissible critical value of an image-quality degradation degree. The digital-watermark-strength calculation means decides an optimum digital watermark strength within a range over which an image-quality degradation degree is less than the permissible critical value of the image-quality degradation value.

In the digital watermark insertion system according to the present invention, the digital-watermark-strength constraint information is a critical value of a safety index to attack. The digital-watermark-strength calculation means decides an optimum digital watermark strength within a range where an attack resistant evaluation value is more than the safety index critical value.

In the digital watermark insertion device according to the present invention, the digital-watermark-strength constraint information is a weighting index deciding a balance between an image-quality degradation degrees and a safety index. The digital-watermark-strength calculation means decides a contribution ratio by the weighting index, the contribution ratio at which the image-quality degradation degree and the safety index contributes to decide an optimum digital watermark strength.

According to the present invention, the digital watermark insertion system further comprises digital-watermark-characteristic table creation means for creating a digital watermark characteristic table describing relationships between digital watermark strength, image-quality degradation degree and attack-resistant evaluation value and for inputting a created digital watermark characteristic table to the storage means.

Moreover, according to the present invention, the digital watermark insertion system, wherein the characteristic table creation means, comprises digital watermark insertion means for converting embedded information to be input into a digital watermark, and inserting the digital watermark into an input image, with a digital watermark strength to be input, whereby a watermarked image is created; attacked-image creation means for attacking the watermarked image with an attack strength, according to an attack parameter to be input, and then creating an attacked-image; digital watermark detection means for detecting on trial the digital watermark of the attacked image and then outputting a detection result; image-quality calculation means for comparing the input image with the watermarked image, calculates the degree of image-quality degradation caused by digital watermark insertion, and then outputting the calculation result as an image-quality degradation amount; image categorizing means for calculating a feature amount of the input image, classifying the input image into a category with the resultant feature amount, and outputting an category index; and characteristic table creation means for obtaining a detection ratio by totaling a series of detection results detected to combinations of various input images and various digital watermark strengths, by category index, digital watermark strength and attack parameter; for obtaining an image-quality amount by calculating attack-resistant evaluation values from the detection ratio by category index and digital watermark strength and by averaging the image-quality degradation amounts by category index and digital watermark strength; and creating a digital watermark characteristic table showing corresponding relationships between digital watermark strength, the image-quality degradation degree and the attack-resistant evaluation value by category index.

In the digital watermark insertion system according to the present invention, the characteristic table creation means comprises means for totaling digital watermark detection results by attack parameter, digital watermark strength and category index and then outputting detection ratio data; means for averaging image-quality degradation amounts by category index and digital watermark strength and then for outputting an image-quality degradation degree; means for obtaining the relationship between attack parameter and detection ratio based on an attack parameter and the detection ratio data and then calculating an resistant evaluation value; and means for integrating digital watermark strength, the image-quality degradation degree and the resistant evaluation value and then creating a digital watermark characteristic table.

In the digital watermark insertion system according to the present invention, the resistant evaluation value calculation means calculates a resistant evaluation value by obtaining an inner product of a function representing the change of a detection ratio for an attack parameter and a weighting function.

In the digital watermark insertion system according to the present invention, the resistant evaluation value calculation means obtains an attack parameter range from a function representing the change of a detection ratio for an attack parameter, the attack parameter range over which the detection ratio is more than a threshold value, and decides a resistant evaluation value based on the length of the attack parameters range.

Furthermore, according to the present invention, a digital watermark characteristic table creating device, comprises digital watermark insertion means for converting embedded information to be input to a digital watermark, and inserting the digital watermark into an input image, with a strength corresponding to a digital watermark strength, whereby a watermarked image is created; attacked image creation means for attacking the watermarked image with an adjusted attack strength according to an input attack parameter, and then creating an attacked image; digital watermark detection means for detecting on trial the digital watermark of the attacked image and then outputting the detection result; image-quality degradation calculation means for comparing the input image with the watermarked image, calculating the degree of image-quality degradation caused by digital watermark insertion, and then outputting the calculation result as an image-quality degradation amount; image categorizing means for calculating a feature amount of the input image, classifying the input image into a category with the resultant feature amount, and then outputting an category index; and characteristic table creation means for obtaining a detection ratio by totaling a series of detection results detected to combinations of various input images and various digital watermark strengths, by category index, digital watermark strength and attack parameter; for obtaining an image-quality degree by calculating attack-resistant evaluation values from the detection ratio by category index and digital watermark strength and by averaging the image-quality degradation amount by category index and digital watermark strength; and then creating a digital watermark characteristic table showing corresponding relationships between digital watermark strength, the image-quality degradation degree and the attack-resistant evaluation value by category index.

In the digital watermark characteristic table creating device according to the present invention, the digital watermark characteristic creation means comprises means for totaling digital watermark detection results by attack parameter, digital watermark strength and category index and then outputting detection ratio data; means for averaging image-quality degradation amounts by category index and digital watermark strength and then outputting an image-quality degradation degree; means for obtaining the relationships between attack parameters and detection ratios based on an attack parameter and the detection ratio data and then calculating a resistant evaluation value; and means for integrating digital watermark strength, the image-quality degradation degree and the resistant evaluation value and then creating a digital watermark characteristic table.

In the digital watermark characteristic table creating device according to the present invention, the resistant evaluation value calculation means calculates a resistant evaluation value by obtaining an inner product of a function representing the change of a detection ratio for an attack parameter and a weighting function.

In the digital watermark characteristic table inserting device according to the present invention, the resistant evaluation value calculation means obtains an attack parameter range from a function representing the change of a detection ratio for an attack parameter, the attack parameter range over which the detection ratio is more than a threshold value, and decides a resistant evaluation value based on the length of the attack parameter range.

According to the present invention, a computer-readable recording medium, wherein the medium records a program realizing a digital watermark insertion system, which inserts digital watermark information into an image, on a computer, comprises means for calculating feature amounts of an input image to classify the input image into a category with the calculated feature amounts, and outputting an category index; storage means for previously storing a digital watermark characteristic table describing the relationships between digital watermark strength, image-quality degradation degree and attack-resistant evaluation value by various category indexes, for selecting the digital watermark characteristic table according to the category index of the input image, and for outputting both the image-quality degradation degree corresponding to an input digital watermark strength and an attack resistant evaluation value; and means for outputting the digital watermark strength to the storage means, deciding an optimum digital watermark strength according to the image-quality degradation degree and the resistant evaluation value output from the storage means, based on input digital watermark strength constraint information, converting embedded data into a digital watermark, and then inserting the digital watermark in the input image, with the optimum digital watermark strength acting as an input parameter, and then outputting the resultant data as a watermarked image.

According to the present invention, the computer-readable recording medium further comprises digital-watermark-characteristic table creation means for creating a digital watermark characteristic table describing relationships between digital watermark strength, image-quality degradation degree and attack-resistant evaluation value and for inputting a created digital watermark characteristic table to the storage means.

Moreover, according to the present invention, a computer-readable recording medium, wherein the medium records a program realizing a digital-watermark-characteristic table creation device on a computer, comprises digital watermark insertion means for converting embedded information to be input into a digital watermark, inserting the electric watermark into an input image, with a strength corresponding to an input digital watermark strength, and creating a watermarked image; attack image creation means for adjusting the attack strength of the watermarked image according to an input attack parameter, and creating an attacked image; digital watermark detection means for detecting on trial the digital watermark of the attacked image and then outputting a detection result; image-quality degradation calculation means for comparing the input image with the watermarked image, calculating a degree of image-quality degradation caused by digital watermark insertion, and outputting the calculation result as image-quality degradation amount; image categorizing means for calculating feature amounts of the input image, classifying the input image into a category with the feature amounts, and outputting an category index; and characteristic table creation means for obtaining a detection ratio by totaling a series of detection results detected to combinations of various input images and various digital watermark strengths, by category index, digital watermark strength and attack parameter; for obtaining an image-quality amount by calculating attack-resistant evaluation values from the detection ratio by category index and digital watermark strength and by averaging the image-quality degradation amount by category index and digital watermark strength; and creating a digital watermark characteristic table showing corresponding relationships between digital watermark strength, the image-quality degradation degree and the attack-resistant evaluation value by category index.

BRIEF DESCRIPTION OF THE INVENTION

This and other objects, features, and advantages of the present invention will become more apparent upon a reading of the following detailed description and drawings, in which:

FIG. 1. is a block diagram illustrating a digital watermark insertion system according to a first embodiment of the present invention;

FIG. 5 is a block diagram illustrating the digital-watermark-characteristic table creation device 132 of FIG. 3;

DESCRIPTION OF THE EMBODIMENTS

Embodiments of the present invention will be described below with reference to the attached drawings.

Figure 1:
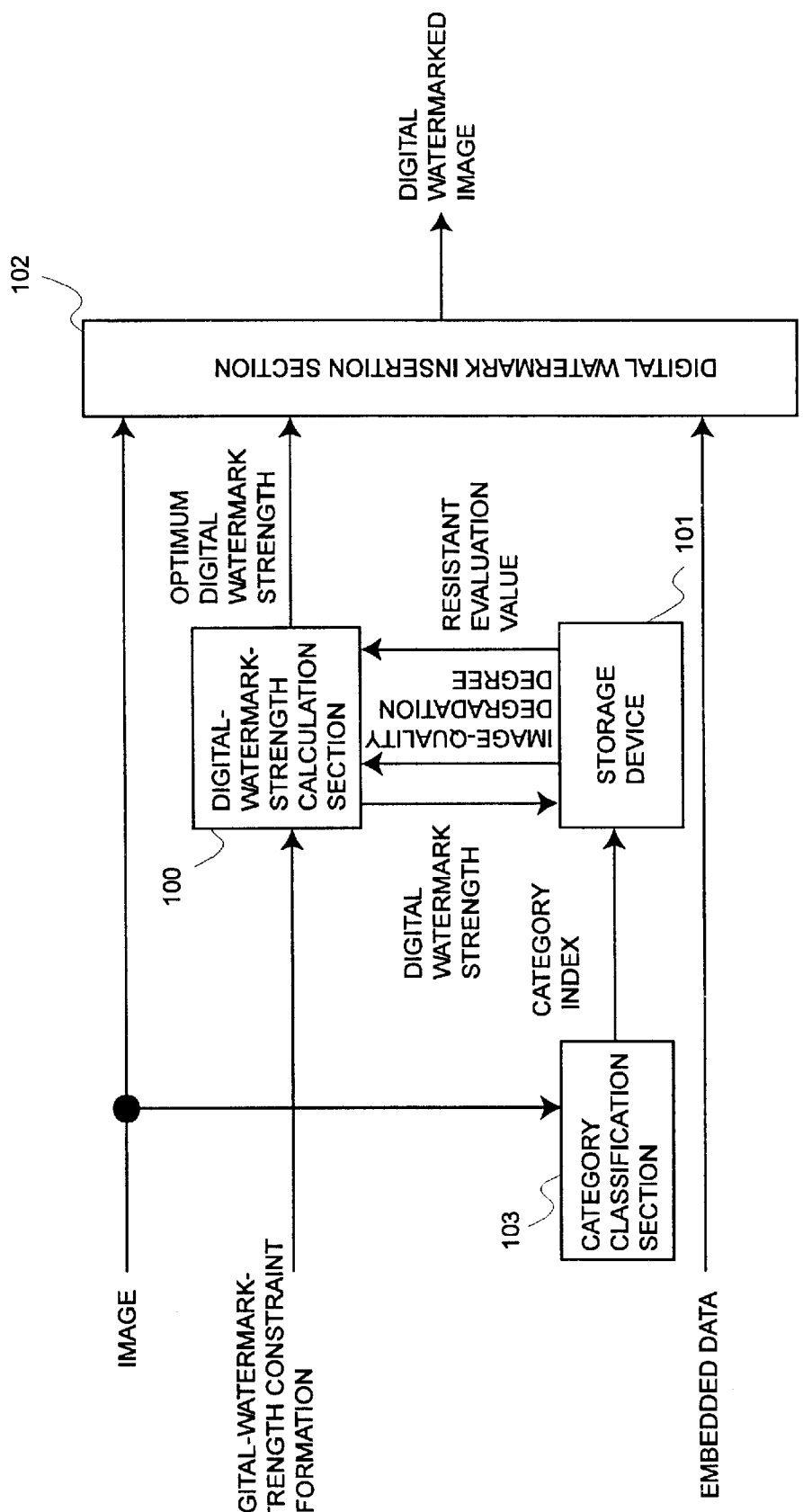

Referring to FIG. 1, the image categorizing section 103 calculates the feature amount of an input image, obtains a category belonging to an image based on the resultant feature amount, and outputs a category index to the storage device 101. The storage device 101 selects a table used with category indexes output from the digital watermark strength calculation section 100 and then outputs the image-quality degradation degree and the resistant evaluation value to a digital watermark strength output from the digital watermark strength calculation section 100, to the digital watermark calculation section 100. The digital watermark strength calculation section 100 outputs various digital watermark values to the storage device 101. Based on the image-quality degradation degree and the resistant evaluation value to a digital watermark strength, which are output as results from the storage device 100, as well as constraint information regarding a digital watermark strength input by a user, the digital watermark strength calculation section 100 decides an optimum digital watermark strength and outputs it to the digital watermark inserter 102. The digital watermark inserter 102 converts embedded data into a digital watermark, inserts the digital watermark in an image, with the optimum digital watermark strength output from the digital watermark calculating section 100, and outputs the watermarked image.

Next, the operation of the digital watermark insertion system shown in FIG. 1 will be described below. First of all, some symbols are defined as follows:

K represents the number of categories into which input images are classified. Each of K categories is distinguished by category index k (=1, . . . , k). s(m) (where m=1, . . . , m) represents a value obtainable as a digital watermark strength at a digital watermark insertion process. The digital watermark strength depends on a digital watermark insertion algorithm. When the digital watermark strength is continuously varied, it is converted to M discrete values over a variable range, each value being represented as s(m). With the category index k and the digital watermark strength s(m), the image-quality degradation degree is represented by D(k, m) and the attack resistant evaluation value is represented by V(k, m).

Next, the operation of the digital watermark insertion system will be described in detail below.

The image categorizing section 103 receives an image and calculates the feature amount of an image, decides which category an input image belongs to based on the resultant feature amount, and outputs a category index representing the category. Specifically, the image categorizing section 103 holds a feature amount defining the boundary of a category and compares it with the calculated feature amount for classification. For example, the activity of the whole image (a square average value of ac frequency components) may be considered as a feature amount.

The category index from the image categorizing section 103 is input to the storage device 101. The storage device 101 stores a digital watermark characteristic table describing the correspondence relationships between digital watermark strength, image-quality degradation degree, and resistant evaluation value against attacking. Table 1 shows a category index (k) to digital watermark characteristic table.

TABLE 1

| Digital Watermark Strength | Image-quality Degradation Degree | Resistant-Evaluation Value Against Attacking |
|---|---|---|
| S(1) | D(k, 1) | V(k, 1) |
| S(2) | D(k, 2) | V(k, 2) |
| : | : | : |
| s(M) | D(k, M) | V(k, M) |

In response to the digital watermark strength s(m) from the digital watermark strength calculation section 100, the storage device 101 selects a digital watermark characteristic table to be used, using a category index k output from the image categorizing section 103 and outputs the image-quality degradation amount D(k, m) and the resistant evaluation value V(k, m) to the digital watermark calculating section 100.

After the system receives an input image and the image categorizing section 103 calculates a category index, the digital watermark strength calculation section 100 calculates the optimum digital watermark strength based on digital watermark strength constraint information input by a user. Basically, the digital watermark strength maximizing the following objective function is handled as an optimum digital watermark strength.

(formula 3)

$$Z(m) = (1-a)(1-D(k,m)) + aV(k,m)$$

where a satisfies the condition of $0 \leq a \leq 1$; and $1-D(k, m)$ is large as the image-quality degradation degree becomes small, that is, as the digital watermark strength becomes small. In contract, V(k, m) becomes large as the digital watermark strength becomes large. Hence, the relationship between (1−D(k, m)) and V(k, m) is in a tradeoff state and the ratio between them is adjusted by a.

Figure 2:
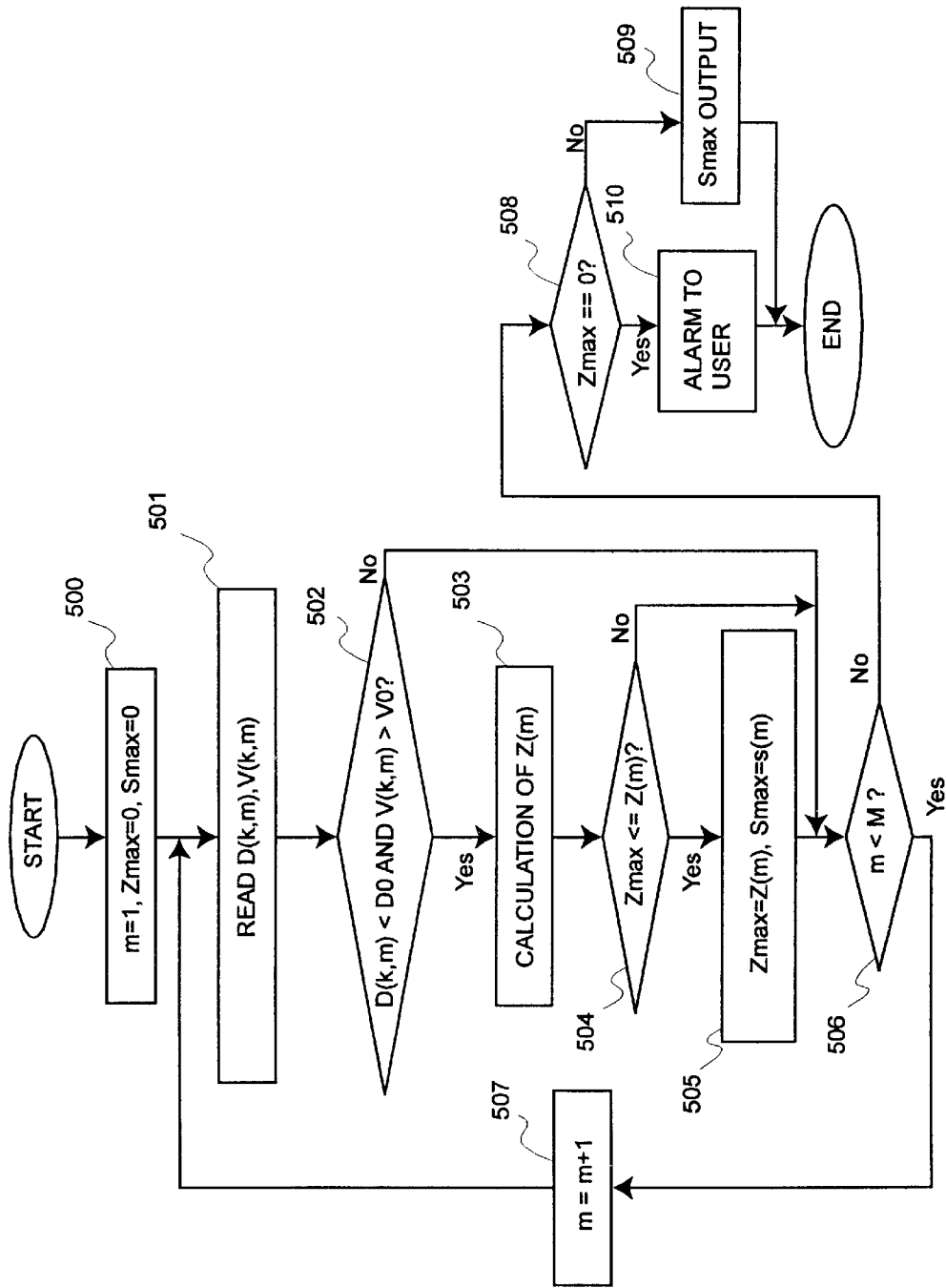
FIG. 2 is a flowchart explaining the operation of the digital-watermark-strength calculation section 100 shown in FIG. 1.

Next, the operation of the digital watermark strength calculation section 100 will be described below by referring to FIG. 2.

In the step 500, the index m of a digital watermark strength is set to 1; the maximum value Zmax of the objective function value (of the formula (3)) is set to 0; and the digital watermark strength Smax that gives the maximum value (of the formula (3)) is set to (0. Next, a digital watermark strength s(m) is input to the storage device 101. As a result, the image-quality degradation degree D(k, m) and the resistant evaluation value V(k, m) are read out of the storage device 101 (step 501). Next, it is checked that the image-quality degradation degree D(k, m) is smaller than a permissible critical value D0 and the resistant evaluation value V(k, m) is larger than the critical value of a safety indicator against attacking (step 502). The permissible critical value D0 and the safety indicator critical value V0 against attacking may be previously set by the system or may be set as digital watermark strength constraint information (as described later). If the condition of the step 502 is satisfied, the objective function (of the formula (3) is calculated (step 503) and the Zmax value is compared with the Z(m) value (step 504). If Z(m) is larger than Zmax, Z(m) is substituted for Zmax and the digital watermark strength value s(m) is substituted for Smax (step 505). If the condition of the step 502 is not satisfied, the process ranging the steps 503 to 505 is skipped. If Z(m) is smaller than Zmax in the step 504, the process of the step 505 is skipped. Then, it is checked whether m<M (step 506). If m<M, m is incremented by 1 (step 507) and the flow returns the step 501. If m≧M, it is checked whether Zmax is not 0 (step 508). If Zmax is not 0, Smax is output as an optimum digital watermark strength to the digital watermark inserter 102. (step 509), so that the process is completed. When Zmax is 0 in the step 508, an alarm indicating that a suitable value cannot be set as a digital watermark strength is issued to the user (step 510) and then the process is ended.

The digital watermark strength calculation section 100 inputs an optimum digital watermark strength to the digital watermark inserter 102. The digital watermark inserter 102 converts input embedded data into a digital watermark and inserts it in an image. The digital watermark strength to be inserted corresponds to an optimum digital watermark strength output from the digital watermark strength calculation section 100. The resultant image is output as a watermarked image.

If a user can indicate as a parameter a digital watermark strength or the equivalent upon a digital watermark insertion, any algorithm can be used as the digital watermark insertion algorithm. For example, the system disclosed in JP-A-No. 191394/1997 or the literature, "IEEE TRANSAC- TIONS ON IMAGE PROCESSING", VOL. IP-6, No. 12, 1997, pp 1673–1687, can be used. In this system, the digital watermark strength is the parameter α contained in the formulas 1 or 2.

In the above-mentioned digital watermark insertion system, the image-quality degradation permissible critical value D0 can be varied as digital watermark strength constraint information. If nothing is specified by the user, a predetermined value is used. If not so, a user specified value is used. Thus, the image-quality degradation due to digital watermark insertion can be adjusted according to a user request.

Moreover, in the digital watermark insertion system, the critical value V0 of a safety indicator against attacking can be varied as digital watermark strength constraint information. If nothing is specified by a user, a predetermined value is used. If not so, a user specified value is used. Thus, the resistant property of a digital watermark against attacking can be adjusted according to a user request.

In the digital watermark insertion system, the parameter a (in the formula (3)), being a weighting indicator which decides the balancing between the image-quality degradation amount and the safety indicator in the objective function, can be varied as digital watermark strength constraint information. If nothing is specified by a user, a predetermined value is used. If a user specifies the parameter, the user specified value is used. Thus, whether the importance to the image-quality degradation or the attack resistant property can be adjusted according to a user request.

Moreover, all of the above control parameters, that is, the image-quality permissible critical value D0, the safety indicator critical value V0, and the weighting indicator a that decides the balance between the image-quality degradation degree and the safety indicator against attacking, can be varied as digital watermark strength constraint information. Predetermined values are used for the control parameters for which no value is specified by a user. Specified values are used for control parameters for which certain values are specified by a user. Thus, the user can arbitrarily adjust the image-quality permissible critical value, the safety indicator critical value against attacking, and the balance between image-quality degradation degree, and resistant property against attacking.

Next, the digital watermark insertion system according to another embodiment of the present invention will be described below by referring to the attached drawings.

Figure 3:
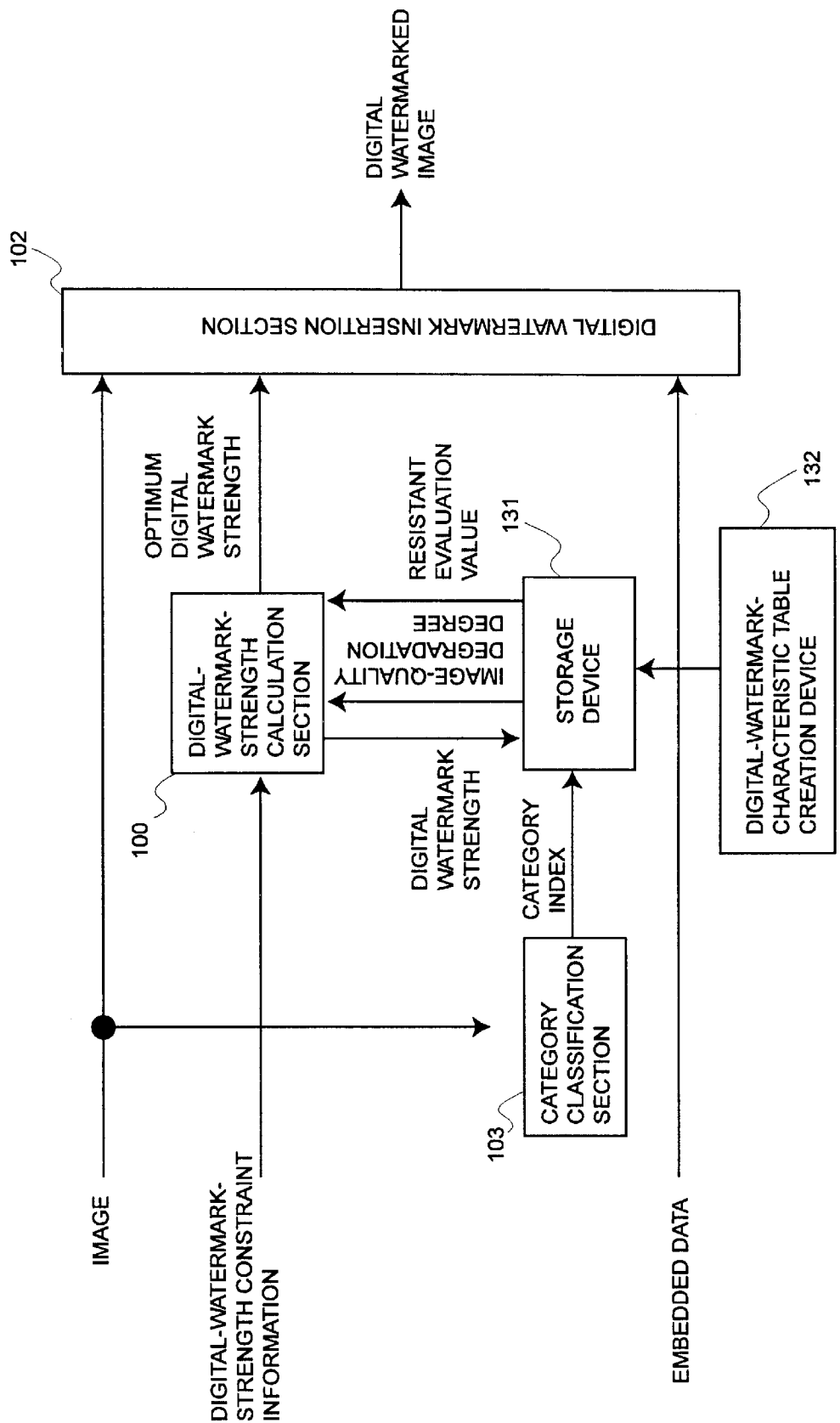
FIG. 3 is a block diagram illustrating a digital watermark insertion system according to a second embodiment of the present invention.

FIG. 3 illustrates the digital watermark insertion system according to an embodiment of the present invention. The digital watermark insertion system in FIG. 3 differs from that in FIG. 1 in that the storage device 131 is connected to the digital watermark insertion device 132, instead of the storage device 101 in the digital watermark insertion system of FIG. 1.

Referring to FIG. 3, the digital watermark characteristic table creation device 132 creates the digital watermark characteristic tables to all category indexes and then stores them in the storage device 131. This digital watermark characteristic table creation device 132 will be described in detail later.

Next, another embodiment of the present invention will be described with reference to the attached drawings.

Figure 4:
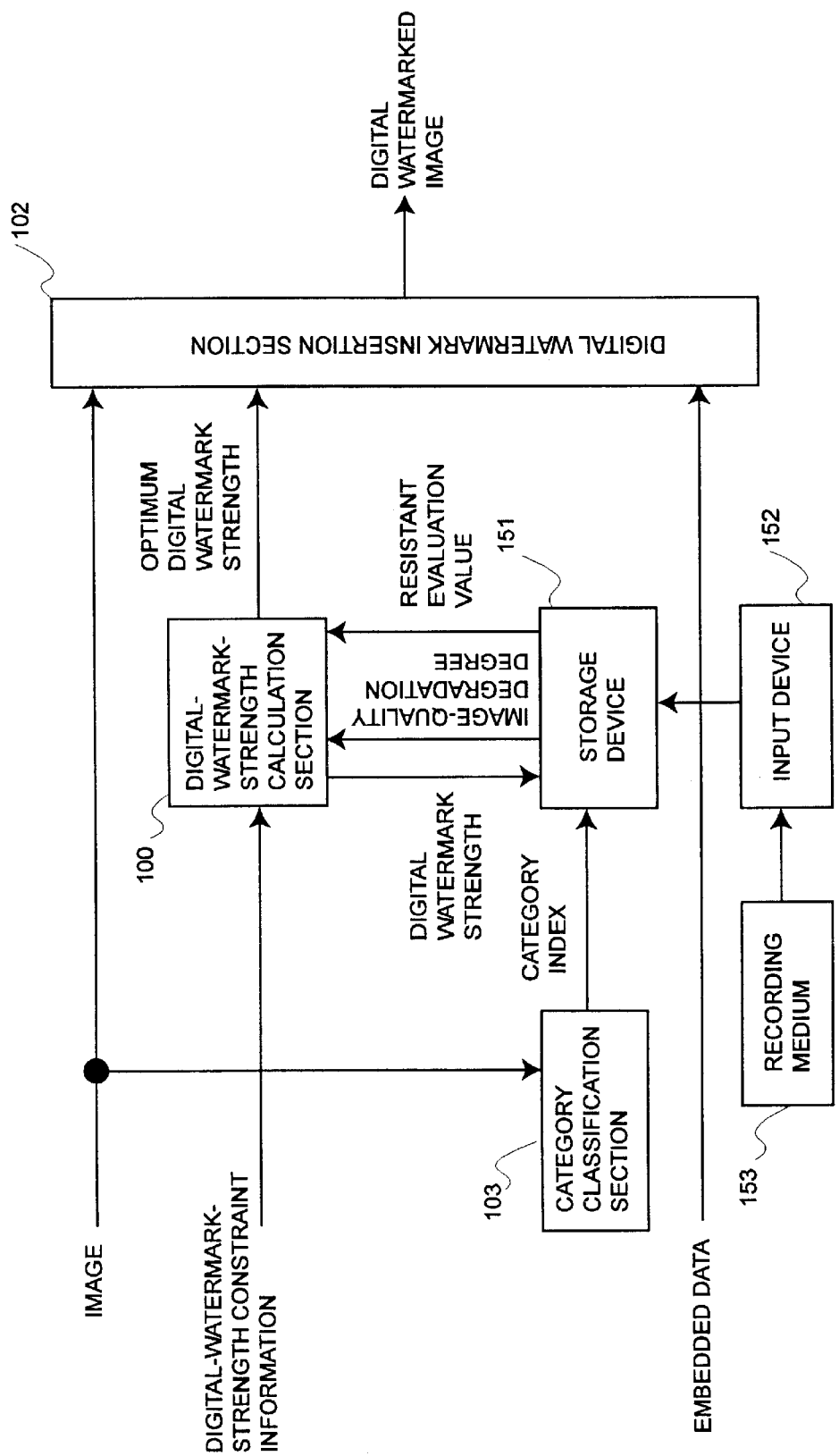
FIG. 4 is a block diagram illustrating a digital watermark insertion system according to a third embodiment of the present invention.

FIG. 4 illustrates the digital watermark insertion system according to an embodiment of the present invention. This digital watermark insertion system differs from that of FIG. 1 in that the input device 152 is connected to the storage device 151, instead of the storage device 101 in the digital watermark insertion system of FIG. 1, and that the recording medium 153 is connected to the input device 152.

Referring to FIG. 4, the device corresponding to the digital watermark characteristic table creation device 132 of FIG. 3 creates a digital watermark characteristic table for each category index and stores it on the recording medium 153. The recorded digital watermark characteristic table is stored in the storage device 151 via the input device 152.

Next, an embodiment of the present invention related to the digital watermark characteristic table creation device 132 shown in FIG. 3 will be described in detail by referring to FIG. 5.

The digital watermark insertion section 200 converts embedded data, inserts a digital watermark with a digital watermark strength to be input, into an input image, and outputs the watermarked image to the attack execution section 201. The attack execution section 201 executes a predetermined attack with a strength set by an input attack parameter on a watermarked image output from the digital watermark insertion section 200, and outputs the attacked image to the digital watermark detection section 202. The digital watermark detection section 202 detects the digital watermark of an attacked image to be output from the attack execution section 201 and then outputs the detection result to the digital watermark characteristic table creation section 205. The image-quality degradation calculation section 203 calculates and image-quality degradation amount based on an input image and a watermarked image from the digital watermark insertion section 200 and then outputs it to the digital watermark characteristic table creation section 205. The image categorizing section 204 classifies input images into categories and outputs category indexes to the digital watermark characteristic table creation section 205. The digital watermark characteristic table creation section 205 obtains the attack resistant evaluation value and the image-quality degradation degree, based on detection results from the digital watermark detector 202, a digital watermark strength, an attack parameter, an image-quality degradation amount output from the image-quality degradation calculation section 203, and category indexes from the image categorizing section 204, and then outputs as digital watermark characteristic tables the relationships between them and digital watermark strength.

Next, the operation of the digital watermark characteristic table creating device of FIG. 5 will be described below. First, the following symbols are defined.

I represents the number of input images. Each of I input images is distinguished by input image index i (=1, ..., I). It is assumed that the attack parameter has x(j)(j=1, ..., J). The attack parameter means an attack strength adjusting parameter. The category index k (=1, ..., K), the digital watermark strength s(m) (m=1, ..., M), the image-quality degradation degree D(k,m) and attack resistant evaluation value V(k,m) are identical to those in the foregoing-described embodiment. k(i) represents a category index to an input image i. d(i) represents an image-quality degradation amount. y(k,m,j) represents a detection result, where k is a category index, m is an index with digital watermark strength, and j is an index of an attack parameter. r(k,m,j) represents a detection ratio, where k is a category index, m is an index with digital watermark strength, and j is an index of an attack parameter.

The operation will be described below in detail with reference to the attached drawings.

In response to the input image i, the digital watermark insertion section 200 converts embedded data into a digital watermark and then inserts it into an image with a parameter acting as a digital watermark strength s(m). Here, the digital watermark insertion algorithm corresponds to that used in the digital watermark insertion section 102 shown in FIG. 1, 3 or 4. The watermarked image is output to the image-quality degradation calculation section 203 and the attack execution section 201.

The attack execution section 201 makes a predetermined attack on a watermarked image and outputs the attacked image to digital watermark detection section 202. The attack strength is decided by the attack parameter x(j) to be differently input. For example, if attacking is done by adding noises, the attack parameter has the amount of noise power, noise magnitude or PSNR (Peak Signal to Noise Ratio) after noise addition. Noises with a strength specified as an attack parameter are added to a watermarked image. If attacking is scaling, the attack parameter has a scaling magnification or the corresponding amount. The watermarked image is scaled with the magnification specified as an attack parameter.

The attack execution section 201 inputs an attacked image to the digital watermark detection section 202 to perform digital watermark detection. The digital watermark detection algorithm for detection corresponds to one used by the digital watermark inserter 200. If an embedded digital watermark is detect, 1 is issued as a detection result. If no embedded digital watermark is detected, 0 is issued as a detection result. If a digital watermark is partially detected, an intermediate value between 1 and 0 is output. The digital watermark detection section 202 outputs the data to the digital watermark characteristic table creation section 205.

The digital watermark detection section 202 may have means for comparing embedded data with the detected digital watermark and deciding how degree the information embedded as a digital watermark has been accurately detected. When data perfectly coincident with the embedded data inserted by the digital watermark inserter has been detected, the means outputs 1. In other cases, the judging means outputs an intermediate value between 0 to 1 according to differences between the embedded data and the detected data.

Figure 6B:
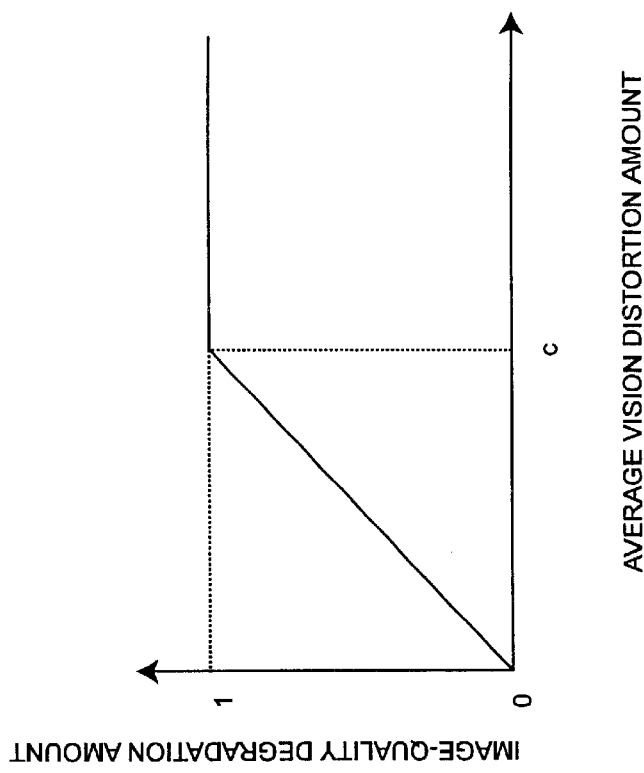
FIGS. 6A and 6B are graphs each plotting functions used for image-quality-degradation amount calculation.
Figure 6A:
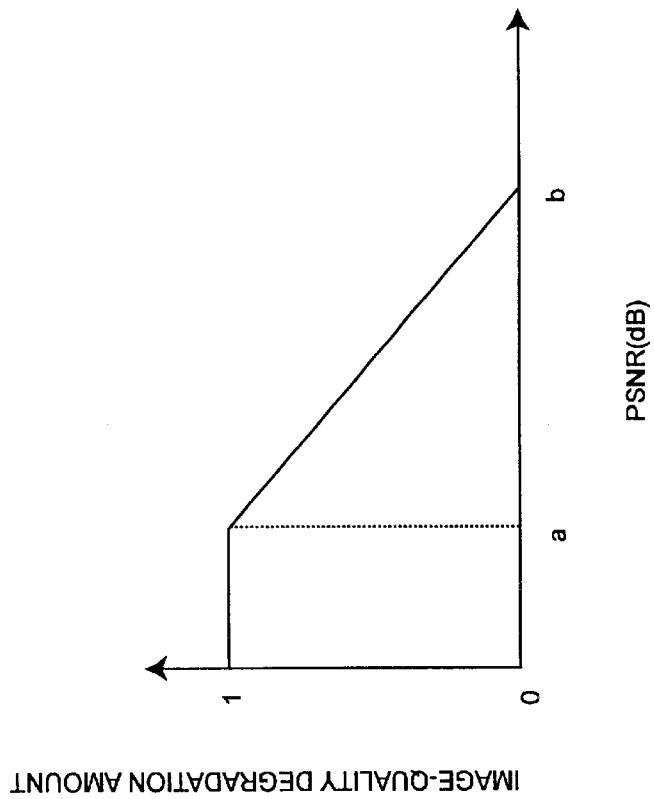

The image-quality degradation calculation section 203 compares the input image with the watermarked image output from the digital watermark inserter 200 and then calculates an image-quality degradation amount caused by digital watermark insertion. For example, the PSNR value of a watermarked image to an original image or the WSNR (Weighted Signal to Noise Ratio) weighted in consideration of visual characteristics (disclosed in the Journal of "Institute of Television Engineers of Japan", Vol. 49, No. 8, August 1995, pp 1078–1086) can be used as the image-quality degradation amount. Moreover, as disclosed in "IEEE TRANSACTION ON CIRCUITS AND SYSTEMS FOR VIDEO TECHNOLOGY", Vol. CSVT-6, No. 6, December, 1995, JND (Just Noticeable Difference) is first obtained. The ratio (hereinafter referred to as visual distortion amount) of the difference between a watermarked image and an original image to the JND is calculated. Then, the resultant value can be used as the image-quality degradation amount. It is now assumed that the dynamic range of the image-quality degradation degree is [0, 1]. In this case, when the PSNR, for example, is used, the PSNR value (peak signal to noise ratio) of an image is calculated and then is converted into an image-quality degradation degree, using the function shown in FIG. 6A. Referring to FIG. 6A, for example, a=20 dB while b=50 dB. In the use of the visual distortion amount, visual distortion values are used. Then, an average visual distortion amount is obtained by averaging the distortion values over the whole image. The average visual distortion amount is converted to an image-quality degradation degree using the function shown in FIG. 6B, In FIG. 6B, c=10. The calculated image-quality degradation degree is output to the digital watermark characteristic table creation section 205.

The input image is input to the categorizing section 204. The operation of the image categorizing section 204 corresponds to that of each of the image categorizing sections shown FIGS. 1, 3 and 4. The feature amount of the input image is calculated. Input images are classified into categories according calculated feature amounts. The category index representing the category is output to the digital watermark characteristic table creation section 205.

The digital watermark characteristic table creation device of FIG. 5 respectively implements the above-mentioned process to I input images i=1, . . ., I). The above-mentioned process is performed to one input image i by changing the digital watermark strength s(m) in M (m=1, . . ., M) ways. The attack parameter x(j) is changed for one digital watermark strength s(m) in j (=1, . . ., J) ways. The digital watermark characteristic table creation section 205 receives the detection results y(k(i),m,j), digital watermark strength s(m), index m, attack parameter x(j), index (j), image-quality degradation amount d(k(i), m), and category index k(i), and then creates a digital watermark characteristic table.

Next, the operation of the digital watermark characteristic table creation section 205 will be described below in detail by referring to the attached drawings.

Figure 7:
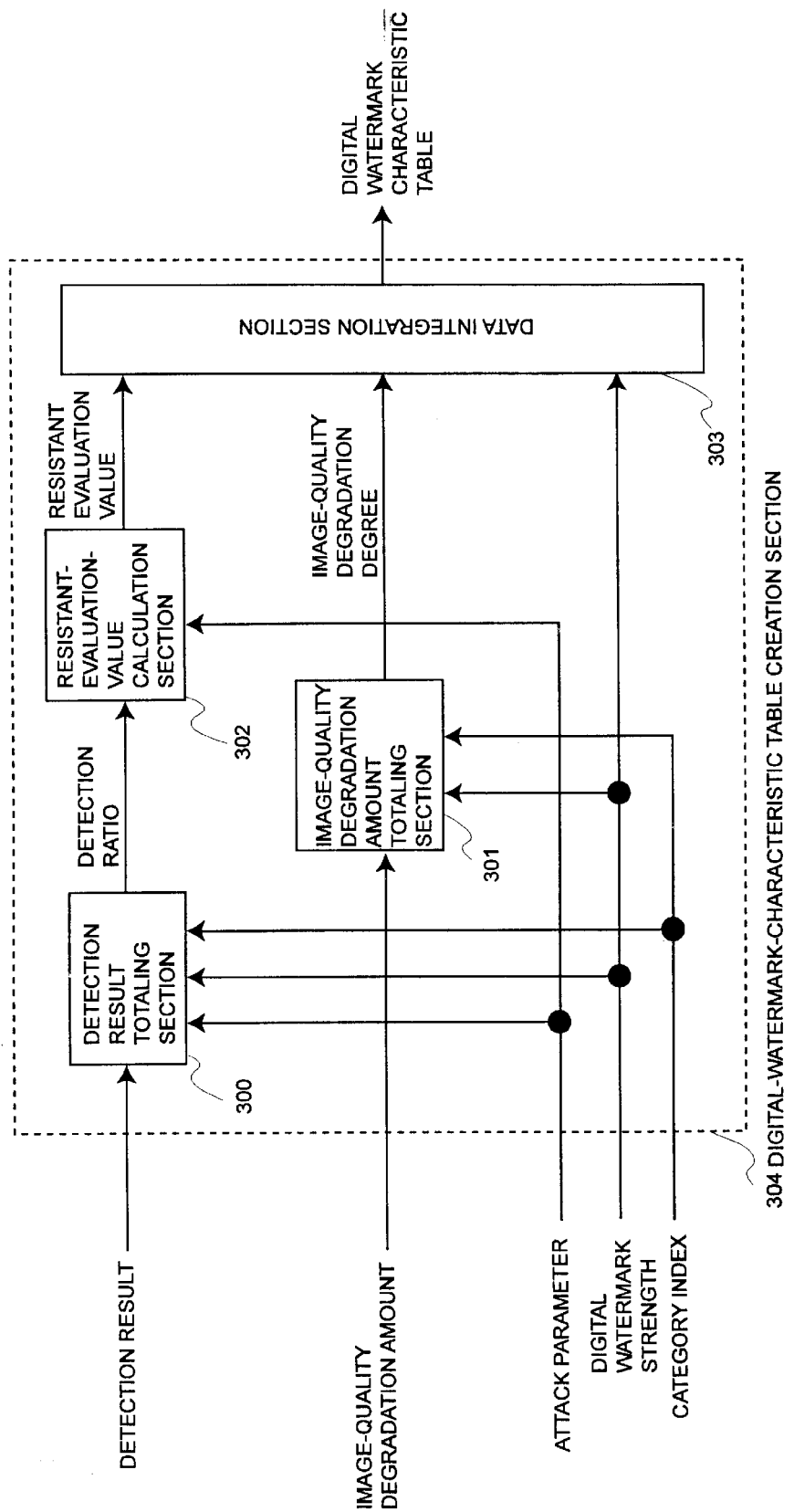
FIG. 7 is a block diagram illustrating the digital-watermark-characteristic table creation table 205 of FIG. 5.

FIG. 7 is a block diagram illustrating the digital watermark characteristic table creation section 205 in this embodiment.

The detection result totaling section 300 adds up the detection results based on attack parameters, digital watermark strengths and category indexes, calculates an detection ratio based on the totaled result, and then outputs it to the resistant evaluation value calculating section 302. The image-quality degradation totaling section 301 adds up the image-quality amounts based on category indexes and digital watermark strengths, calculates an image-quality degradation degree, and then outputs it to the data integration section 303. The resistant evaluation value calculating section 302 calculates an attack resistant evaluation value based on the detection ratio output from the detection result totaling section 303 and the attack parameter, and then outputs it to the data integration section 303. The data integration section 303 creates a table describing correspondences between digital watermark strength, image-quality degradation degree, and resistance evaluation value by category index and outputs it as a digital watermark characteristic table.

Next, the operation of the digital watermark characteristic table creation section of FIG. 7 will be described later.

The digital watermark result y(k(i), m(j)) is input to the detection result totaling section 300. The detection result totaling section 300 has storage means that classifies detection results by category index k, by digital watermark strength index m and by attack parameter index j, and adds up and stores the classified detection results. It is assumed that the array for totaling the detection results is Sum1 (k, m, j) (k=1, . . ., M, m=1, . . ., M and j=1, . . ., J) and that the array for counting the number of images by category index is N1 (k, m) (k=1, . . ., K, m=1, . . ., M). At the initial state, all Sum1 (k, m) are set to zero while all N1 (k, m) are set to zero. When the category index k(i), digital watermark strength index m, attack parameter index j, and detection result y(k(i), m, j) to the n-th images of n are input, the detection y(k(i), m, j) are added so that the value Sum1 (k(i), m, j) is updated. However, when only j or i, j and m changes, the value N1 (k(i), m) is not updated. The above-mentioned process is repeated to all digital watermark strengths (m=1, . . ., M), to all images (I=1, . . ., I) and to all attack parameters (j=1, . . ., J). When the processes to all m, I and j are completed, the detection ratio r(k, m, j) is calculated by the following formula and then is output to the resistant evaluation value calculating section 302.
(formula 4)

$$r(k, m, j) = \frac{Sum1(k, m, j)}{N1(k, m)}$$

The resistance evaluation value calculation section 302 calculates an attack resistance evaluation value V(k, m) based on the detection ratio r(k, m, j) output from the detection result totaling section 300 and then outputs it to the data integrating section 303. The operation of the resistance evaluation value calculation section 302 will be later described in detail.

On the other hand, the image degradation amount d(i) is input to the image-quality degradation totaling section 301. The image-quality degradation totaling section 301 with storage means totals image-quality degradation amount by category index and stores the result. It is assumed that the array of totaling image-quality degradation amount is Sum2 (k, m) (k=1, . . ., K, m=1, . . ., M), and that the array of counting the number of images by category index is N2 (k, m) (k=1, . . ., K, and m=1, . . ., M). At the initial state, all values Sum2 (k, m) are set to zero while all values N2 (k, m) are set to zero. When the category index k(i), digital watermark strength index m, and image-quality degradation amount d(i) to the i-th images of n are input, d is added to the value Sum2 (k(i), m) so that the value Sum2 (k(i), m) is updated. The value N2 (k(i), m) is updated by adding 1 to it. The above-mentioned process is repeated to all digital watermarks strengths (m=1, . . ., I) represented with (m=1, . . ., M) and to all images represented with (i=1, . . ., I). When the processes to all m and 1 are completed, the image-quality degradation degree D(k, m) is calculated by the following formula and then is output to the data integrating section 303.
(formula 5)

$$D(k, m) = \frac{Sum2(k, m)}{N2(k, m)}$$

The data integration section 303 integrates the resistant evaluation value V(k, m) output from the resistant evaluation value calculation section 302, the image-quality degradation degree K(k, m) and digital watermark strength s(m) and then creates the watermark characteristic table (shown in the table 1) by each category index k.

Next, how to calculate resistant evaluation values by the resistant evaluation value calculation section 302 will be described below. First, the calculation method is outlined below.

Let us know consider that how the detection ratio changes as the attack parameter x continuously varies. When it is assumed that the detection ratio to the attack parameter x, with a category index k and digital watermark strength index m, is ra(k, m, x), the resistant evaluation value V(k, m) is basically calculated using the following formula containing the weighting function w(x).

(formula 6)

$$V(k, m) = \int_{-\infty}^{\infty} w(x) r_a(k, m, x) dx$$

The weighting function w(x) decides a contribution to the resistant evaluation value V(k, m) of a detection ratio to each attack parameter x. When the range of the resistant evaluation value V(k, m) is [0, 1], not an absolute condition, the weighting function w(x) satisfies the following formula.
(formula 7).

$$\int_{-\infty}^{\infty} w(x) dx = 1$$

Figure 8C:
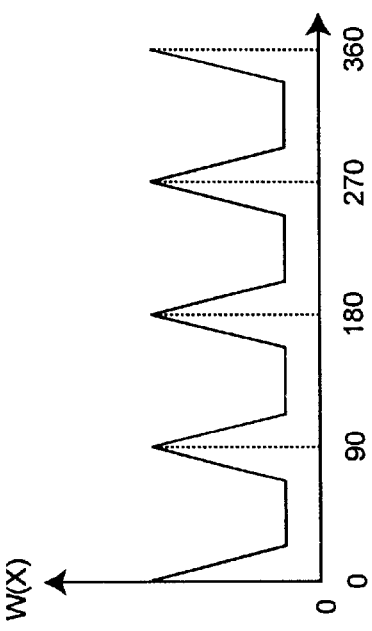
FIGS. 8A, 8B and 8C are graphs each plotting weighting functions used for attack-resistant evaluation value calculation.
Figure 8B:
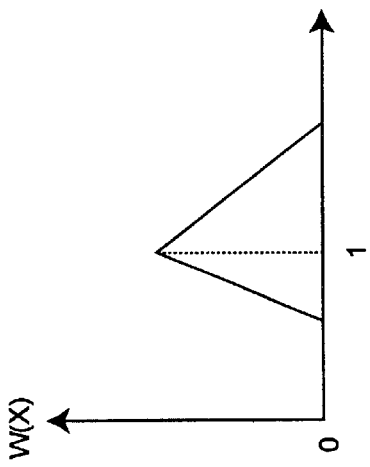
Figure 8A:
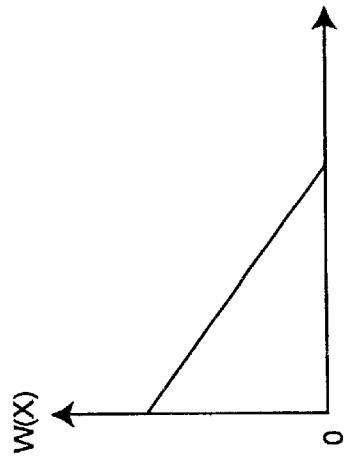

The form of the weighting function w(x) depends on the type of attacking or applications to be considered. For example, if attacking is done though adding noises and the attack parameter is a noise power, the monotonous decreasing function shown in FIG. 8A is selected as the weighting function. The reason is that the image-quality degradation after noise addition becomes large with an increasing noise power and that the detection ratio in a large noise power is not important, compared with that in a small noise power. When a predetermined attack is scaling and the attack parameter is magnification, the weighting function w(x) is a function of having the maximum value at x=1 and decreasing its value as the distance from the maximum value increases, as shown, for example, in FIG. 8. The reason is that the image-quality deteriorates through decimating or interpolating pixels as the magnification becomes far from 1, so that detection ratios with magnifications far from 1 are not important, compared those with magnifications close to 1. If a predetermined attack is rotation and the attack parameter is a rotation angle, the weighting function w(x) may have the form shown, for example, in FIG. 8C. The reason is that it is considered that, upon an image editing with an editing tool, images are more frequently rotated to angles corresponding to multiples of 90 degrees, compared with other angles. Moreover, it is considered that, upon an image reading with a scanner after a printing operation, images are more frequently rotated to angles corresponding to multiples of 90 degree or to the adjacent angles, compared with other angles. Hence, the detection ratio at angles corresponding to multiples of 90 degree and to the adjacent angles is important, compared with other angles. Hence, the form shown in FIG. 8C is reasonable.

Next, the method of actually calculating resistant evaluation values V(k, m) according to the above—mentioned method.

Figure 9B:
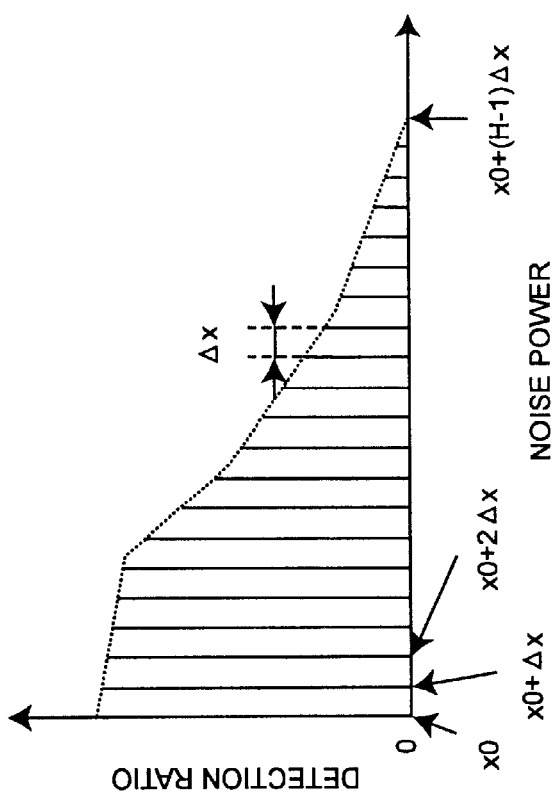
FIGS. 9A and 9B are graphs each plotting an example of sampled detection ratios.
Figure 9A:
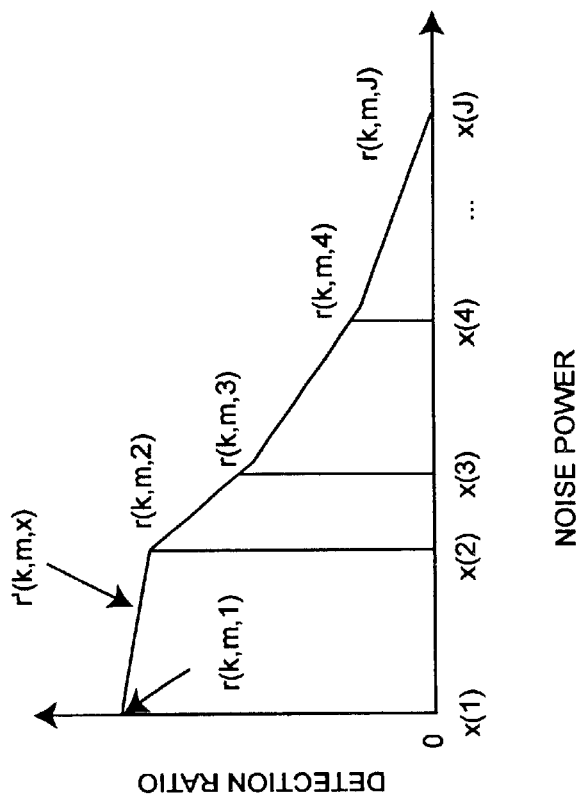
Figure 10:
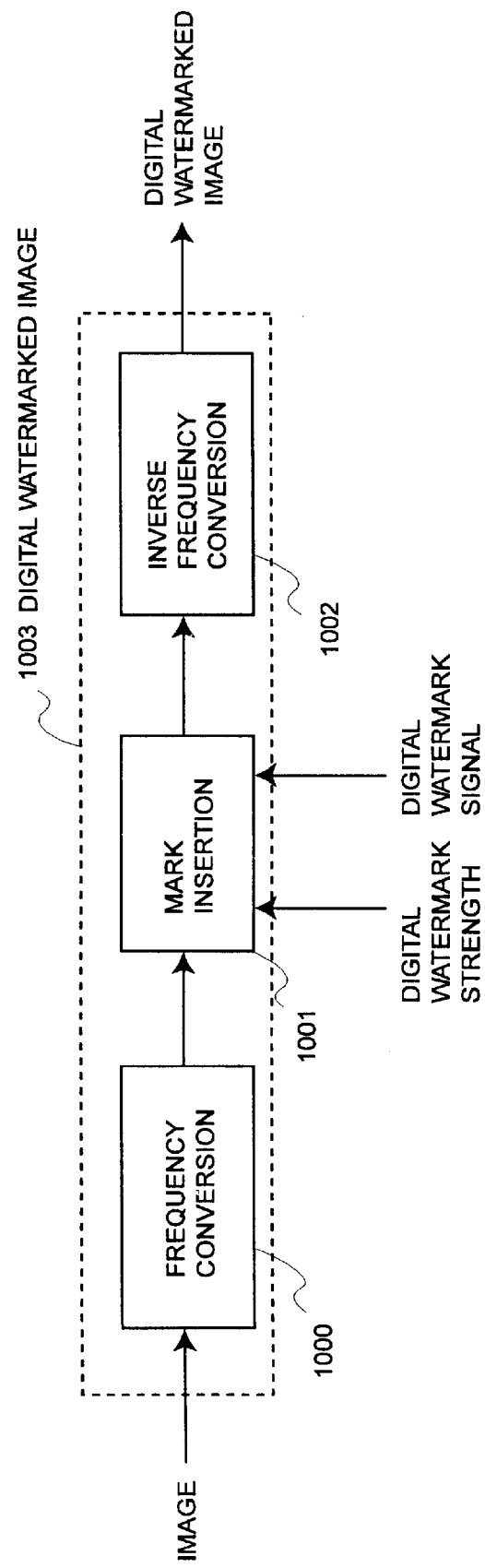
FIG. 10 is a diagram illustrating a related-art digital watermark inserter.

Only values to discrete attack parameter x(j) (j=1, . . ., J), not a continuous function to an attack parameter x, are obtained as the detection ratio. The weighting function w(x) does not have function values to given values x but has values to some attack parameters. It is assumed that the waveform shown in FIG. 9 is obtained by making a linear approximation of discrete values. The detection ratios are obtained by sampling the waveform with the width Δx narrower than the discrete interval between the attack parameters x(j) used for the detection ratio calculation, and are used to calculate resistant evaluation values. The resistant evaluation value calculation section 302 has storage means that stores weighting function values w(x) to some attack parameters x. A linear approximated function is considered using the function values. The weighting function value, which sampled at the same position as that for the detection ratio, is obtained and then is used for resistant evaluation value calculation.

As shown in FIG. 9, the function r' (k, m, x) is obtained by linear-approximating ra(k, m, x) while the function w' (x) is obtained by linear-approximating w(x). If the sampling positions are x=x0, x0+Δx, x0+2Δx, . . ., x0+ (H−1) Δx, the formula (6) can be approximated by the following formula.
(formula 8)

$$V(k, m) = \sum_{n=0}^{H-1} w'(x_0 + h\Delta x) r'(k, m, x_0 + h\Delta x) \Delta x$$

The resistance evaluation value V(k, m) of the formula (8) is calculated to each category index x and each digital watermark strength m, and is output to the data integration section 303.

This system allows comprehensive resistant evaluation values against attacking to be calculated, in consideration of the whole attack parameters. In addition to parameters obtained through actual attacking, since even parameters obtained though no actual attacking are used through a detection ratio interpolative prediction, the difference between ways of selecting the attack parameter x(j) is suppressed to a small value, so that the resistant evaluation values can be accurately calculated. The resistant evaluation value is calculated using the weighting function. Hence, by suitably designing the resistant evaluation value, the human's subjective judgement to degradation caused by attacking or frequency information as to attacking can be reflected to evaluation values. Moreover, the weighting function can be changed according to applications by merely changing only the weighting function data, which is stored in the storage means within the resistant evaluation value calculation section 302.

Next, another method of calculating resistant evaluation values in the resistant evaluation value calculation section 302 shown in FIG. 7 will be described below. First, the calculation by this method will be outlined here.

In a similar manner to the foregoing method, let us now consider how the detection ratio changes when the attack parameter x continuously varies. The resistant evaluation value V(k, m) to category index k and digital watermark strength index m is obtained by the following formula.
(formula 9)

$$V(k, m) = \frac{1}{L} \int_{-\infty}^{\infty} T(r_a(k, m, x), \alpha) dx$$

where L represents the length of an attack parameter segment acting as reference and T(x, α) is a 2-value function expressed as the following formula:
(formula 10)

$$T(x, \alpha) = \begin{cases} 1 & (x > \alpha) \\ 0 & (x \leq \alpha) \end{cases}$$

Thus, the ratio of the length of the segment where the detection ratio is larger than the threshold value α to the reference length L is calculated as a resistant evaluation value. In an actual case, the resistant evaluation value is calculated by linear—approximating the function of detection ratio, by finely sampling approximate values and by approximating the formula (9) with the following formula (11). The resistant evaluation value V(k, m) of the formula (11) is calculated to each category index k and each digital watermark strength m. Then the result are output to the data integration section 303.
(formula 11)

$$V(k, m) = \frac{1}{L} \sum_{n=0}^{H-1} T(r'(k, m, x_0 + h\Delta x), \alpha) \Delta x$$

This method can provide the resistant evaluation value calculation attaching importance to high reliability, in consideration of only the ranges with high detection ratios. This method also can calculate accurate resistant evaluation values for the same reason as that described as to the method using weighting functions.

The digital watermark insertion system and the digital watermark characteristic table creating device have been described according to the embodiments of the present invention. Finally, a recording medium which records a program for realizing the digital watermark insertion system and the digital watermark characteristic table creating device will be described here as an embodiment.

The recording medium according to the present invention can be realized by, for example, a CD-ROM or FD. The recording medium records a program described with a program language with which the computer can be read and execute the functions of the above-mentioned device or system.

The recording medium may be a hard disk provided in a server. The recording medium can be realized to record the computer program and to read out it via a network.

The advantage of the present invention is that a user can decide and insert a digital watermark strength suitable to input images with no trial and error.

The reason is that a suitable digital watermark strength is dynamically calculated and used for digital watermark insertion using a table which includes input images classified by category and which describes the digital watermark strength, image-quality degradation degree, and attack resistant evaluation value of an image belonging to each category.

The entire disclosure of Japanese Application No. 10-150823 filed Jun. 1, 1998 including specification, claims, drawing and summary are incorporated herein by reference in its entirely.

What is claimed is:

1. A digital watermark insertion system, wherein digital watermark information is inserted in an image, comprising:

means for calculating feature values of input images, classifying said input images into categories with said features values, and outputting a category index;

storage means for storing digital watermark characteristic tables according to predetermined various category indexes, each of said tables describing relationships between digital watermark strength, image-quality degradation degree and attack-resistant evaluation value, selecting a digital watermark characteristic table according to the category index of an input image, and outputting an image-quality degradation degree corresponding to an input digital watermark strength and an attack-resistant evaluation value;

digital-watermark-strength calculation means for outputting said digital watermark strength to said storage means, and deciding and outputting an optimum digital watermark strength using digital-watermark-strength constraint information to be input based on said image-quality degradation degree and said attack-resistant evaluation value output from said storage means; and means for converting embedded data to be input into a digital watermark, inserting said digital watermark into said input image, with said optimum digital watermark strength acting as an input parameter, and outputting it as a watermarked image.

2. The digital watermark insertion system defined in claim 1, wherein said digital-watermark-strength constraint information is a permissible critical value of an image-quality degradation degree; and wherein said digital-watermark-strength calculation means decides an optimum digital-watermark strength within a range over which an image-quality degradation degree is less than the permissible critical value of said image-quality degradation value.

3. The digital watermark insertion system defined in claim 1, wherein said digital-watermark-strength constraint information is a critical value of a safety index to attack; and wherein said digital-watermark-strength calculation means decides an optimum digital watermark strength within a range where an attack resistant evaluation value is more than said safety index critical value.

4. The digital watermark insertion device defined in claim 1, wherein said digital-watermark-strength constraint information is a weighting index deciding a balance between an image-quality degradation degree and a safety index; and wherein said digital-watermark-strength calculation means decides a contribution ratio by said weighting index, said contribution ratio at which said image-quality degradation degree and said safety index contributes to decide an optimum digital watermark strength.

5. The digital watermark insertion system defined in claim 1, further comprising digital-watermark-characteristic table creation means for creating a digital watermark characteristic table describing relationships between digital watermark strength, image-quality degradation degree and attack-resistant evaluation value and for inputting a created digital watermark characteristic table to said storage means.

6. The digital watermark insertion system defined in claim 5, wherein said characteristic table creation means, comprising:

digital watermark insertion means for converting embedded information to be input into a digital watermark, and inserting said digital watermark into an input image, with a digital watermark strength to be input, whereby a watermarked image is created;

attacked-image creation means for attacking said watermarked image with an attack strength, according to an attack parameter to be input, and then creating an attacked-image;

digital watermark detection means for detecting on trial the digital watermark of said attacked image and then outputting a detection result;

image-quality calculation means for comparing said input image with said watermarked image, calculates the degree of image-quality degradation caused by digital watermark insertion, and then outputting the calculation result as an image-quality degradation amount;

image categorizing means for calculating a feature amount of said input image, classifying said input image into a category with the resultant feature amount, and outputting an category index; and characteristic table creation means for obtaining a detection ratio by totaling a series of detection results detected to combinations of various input images and various digital watermark strengths, by category index, digital watermark strength and attack parameter; for obtaining an image-quality amount by calculating attack-resistant evaluation values from said detection ratio by category index and digital watermark strength any by averaging said image-quality degradation amounts by category index and digital watermark strength; and creating a digital watermark characteristic table showing corresponding relationships between digital watermark strength, said image-quality degradation degree and said attack-resistant evaluation value by category index.

7. The digital watermark insertion system defined in claim 6, wherein said characteristic table creation means comprises:

means for totaling digital watermark detection results by attack parameter, digital watermark strength and category index and then outputting detection ratio data;

means for averaging image-quality degradation amounts by category index and digital watermark strength and then for outputting an image-quality degradation degree;

means for obtaining the relationship between attack parameter and detection ratio based on an attack parameter and said detection ratio data and then calculating an resistant evaluation value; and means for integrating digital watermark strength, said image-quality degradation degree and said resistant evaluation value and then creating a digital watermark characteristic table.

8. The digital watermark insertion system defined in claim 7, wherein said resistant evaluation value calculation means calculates a resistant evaluation value by obtaining an inner product of a function representing the change of a detection ratio for and attack parameter and a weighting function.

9. The digital watermark insertion system defined in claim 7, wherein said resistant evaluation value calculation means obtains an attack parameter range from a function representing the change for a detection ratio to an attack parameter, said attack parameter range over which said detection ratio is more than a threshold value, and decides a resistant evaluation value based on the length of said attack parameter range.

10. A computer-readable recording medium, wherein said medium records a program realizing a digital watermark insertion system, which inserts digital watermark information into an image, on a computer, comprising:

means for calculating feature amounts of an input image to classify said input image into a category with said calculated feature amounts, and outputting an category index;

storage means for previously storing an digital watermark characteristic table describing the relationships between digital watermark strength, image-quality degradation degree and attack-resistant evaluation value by various category indexes, for selecting said digital watermark characteristic table according to the category index of said input image, and for outputting both the image-quality degradation degree corresponding to an input digital watermark strength and an attack resistant evaluation value; and means for outputting said digital watermark strength to said storage means, deciding an optimum digital watermark strength according to said image-quality degradation degree and said resistant evaluation value output from said storage means, based on input digital watermark strength constraint information, converting embedded data into a digital watermark, and then inserting said digital watermark in said input image, with said optimum digital watermark strength acting as an input parameter, and the outputting the resultant data as a watermarked image.

11. The computer-readable recording medium, defined in claim 10, further comprising digital-watermark-characteristic table creation means for creating a digital watermark characteristic table describing relationships between digital watermark strength, image-quality degradation degree and attack-resistant evaluation value and for inputting a created digital watermark characteristic table to said storage means.

* * * * *